United States Patent [19]
Fritsch, Jr. et al.

[11] 3,979,216
[45] Sept. 7, 1976

[54] LOW THERMAL EXPANSION COEFFICIENT SYNTHETIC CORDIERITE-CONTAINING CERAMIC BODIES AND METHOD FOR PRODUCING SAME

[75] Inventors: Carl W. Fritsch, Jr., Dushore; Sergej-Tomislav Buljan, Towanda, both of Pa.

[73] Assignee: GTE Sylvania Incorporated, Stamford, Conn.

[22] Filed: Mar. 27, 1975

[21] Appl. No.: 562,773

[52] U.S. Cl. .................................. 106/62; 106/46; 106/73.4
[51] Int. Cl.² ......................................... C04B 35/20
[58] Field of Search ................ 106/62, 73.4, 45, 46

[56] References Cited
UNITED STATES PATENTS

| | | | |
|---|---|---|---|
| 3,288,615 | 11/1966 | Estes et al. | 106/40 |
| 3,531,307 | 9/1970 | Rubin et al. | 106/62 |
| 3,885,977 | 5/1975 | Lachman et al. | 106/62 |

*Primary Examiner*—Helen M. McCarthy
*Attorney, Agent, or Firm*—Norman J. O'Malley; John C. Fox; Donald R. Castle

[57] ABSTRACT

Synthetic cordierite ($2MgO,2Al_2O_3.5SiO_2$) ceramic bodies exhibiting low thermal expansions are characterized by a microstructure containing less than 10 percent by volume glass and by microcracks of certain size and frequency of occurrence and may be produced, for example, by (1) dry ball milling talc, ball clay and alpha alumina in noncontaminating media, (2) consolidating the mixture to form a green body, (3) heating the green body at a rate of up to 150°C per hour to a temperature within the range of 1350° to 1425°C, (4) holding the body at this temperature for a time of from ½ to 10 hours, and (5) cooling the body to below 1,000°C at a rate of up to 150°C per hour. Such bodies possess good to excellent thermal shock resistance, and chemical durability and are useful, for example, as components in gas turbine engines.

10 Claims, 5 Drawing Figures

LOW THERMAL EXPANSION COEFFICIENT SYNTHETIC CORDIERITE-CONTAINING CERAMIC BODIES AND METHOD FOR PRODUCING SAME

BACKGROUND OF THE INVENTION

This invention relates to synthetic cordierite-containing ceramic ($2MgO.2Al_2O_3.5SiO_2$) bodies having low values of thermal expansion, and also relates to a method for producing the bodies.

The attractiveness of ceramics as materials for components of high temperature engines is widely recognized. For example, the heat exchanger is an integral part of gas turbine engine designs. The purpose of the heat exchanger is to recover waste heat losses and to preheat the incoming air in order to improve efficiency of engine operation. The level of both fuel consumption, and noxious exhaust emissions are expected to be significantly lower than for conventional internal combustion engines. Ceramic heat exchangers have the advantage of high temperature capabilities which has a direct effect on engine efficiency. Ceramics are also lighter in weight than metals and have the potential for lower cost.

Increased efforts in the last few years on gas turbine engine development have initiated research on ceramic materials possessing the necessary thermal shock and corrosion resistance, as well as adequate mechanical strength, density and thermal stability. Considerable attention has been focused on lithia-alumina-silica (LAS) and magnesia-alumina-silica (MAS) ceramics for these applications because of their low thermal expansion coefficients and correspondingly high thermal shock resistance. At present, MAS materials appear to exhibit better chemical durability than LAS materials in the particularly corrosive environment of high temperature combustion engine operation.

Early work on MAS was directed to producing bodies having a high percentage of synthetic cordierite and to characterizing the phase relationships and crystal structures of the resulting materials. An extensive review of early work is contained in Synthetic Cordierite, M. E. Tyrrell et al., Bulletin 594 of the Bureau of Mines, U.S. Government Printing Office, Washington, D.C., 1961. Tyrrell et al. were primarily concerned with achieving efficient synthesis of dense MAS bodies containing high percentages of cordierite and high dielectric constants. During the course of their investigation, techniques for producing slags consistently high in cordierite were developed, and are described in U.S. Pat. No. 2,731,355. The best thermal expansion coefficients reported are about 1.84 centimeters per centimeter per degree $Cx10^6$ between 20°C and 800°C, which is equivalent to about 1424 parts per million within this temperature range.

Similar studies to obtain dense synthetic cordierite bodies having high dielectric constants are reported in *Inorganic Dielectric Research*, E. J. Smoke, Research and Development Technical Report ECOM — 0232 — 5, U.S. Army Electronics Command, Fort Monmouth, N.J., December, 1969. Thermal expansion data indicated values were obtained which were equivalent to at least about 1160 parts per million within the range 25°C to 800°C which is expected for conventional cordierite bodies. The calculated value for polycrystalline cordierite bodies from lattice thermal expansion data obtained by G. R. Fisher et al. (American Crystallographic Association Meeting, University Park, Pennsylvania 1974) using X-ray diffraction techniques is 1120 parts per million within the range 25°C to 800°C.

In view of the recent emphasis upon obtaining ceramic materials possessing excellent thermal shock resistance for use in high temperature engine applications, recent efforts have been directed toward lowering the thermal expansion coefficients of MAS bodies in order to meet the thermal shock requirements imposed by the intended applications.

SUMMARY OF THE INVENTION

In accordance with one embodiment of the invention, synthetic cordierite-containing ceramic bodies having compositions centering around the $2MgO.2Al_2O_3.5SiO_2$ composition have been developed which exhibit thermal expansions lower than 1100 and preferably lower than 800 parts per million within the temperature range 25°C to 800°C. The microstructures of these bodies are characterized by a glass content less than about 10 volume percent and by microcracks of specified size and frequency of occurrence.

In another embodiment, a method is provided for producing the low thermal expansion cordierite-containing ceramic bodies of the invention, the method including the steps of: (1) combining the raw materials talc, ball clay and a starting material which on firing will yield $Al_2O_3$, in the desired proportions to achieve on firing a cordierite-containing composition within the range of 13 to 16 percent MgO, 30 to 36 weight percent $Al_2O_3$, and 49 to 54 weight percent $SiO_2$; (2) ball milling the starting materials, preferably in non-contaminating milling media; (3) consolidating the resulting mixture to form a green ceramic body; (4) heating the green body at a rate of up to 350°C per hour to a temperature within the range of about 1350°C to 1425°C; (5) holding the body at this temperature for a time of at least about ½ to 6 hours in order to convert the green ceramic body to a polycrystalline sintered ceramic body; and (6) cooling the ceramic body to below about 1,000°C at a rate of up to 500°C per hour, to achieve the desired microstructure. The body may thereafter be cooled to room temperature at a noncritical rate such as by air quenching. The resulting bodies possess low thermal expansions, good to excellent thermal shock resistance, as well as chemical durability, density, thermal stability, and good mechanical strength, and are useful, for example, as heat exchanger materials in high temperature engines.

DETAILED DESCRIPTION OF THE INVENTION

Figure 1:
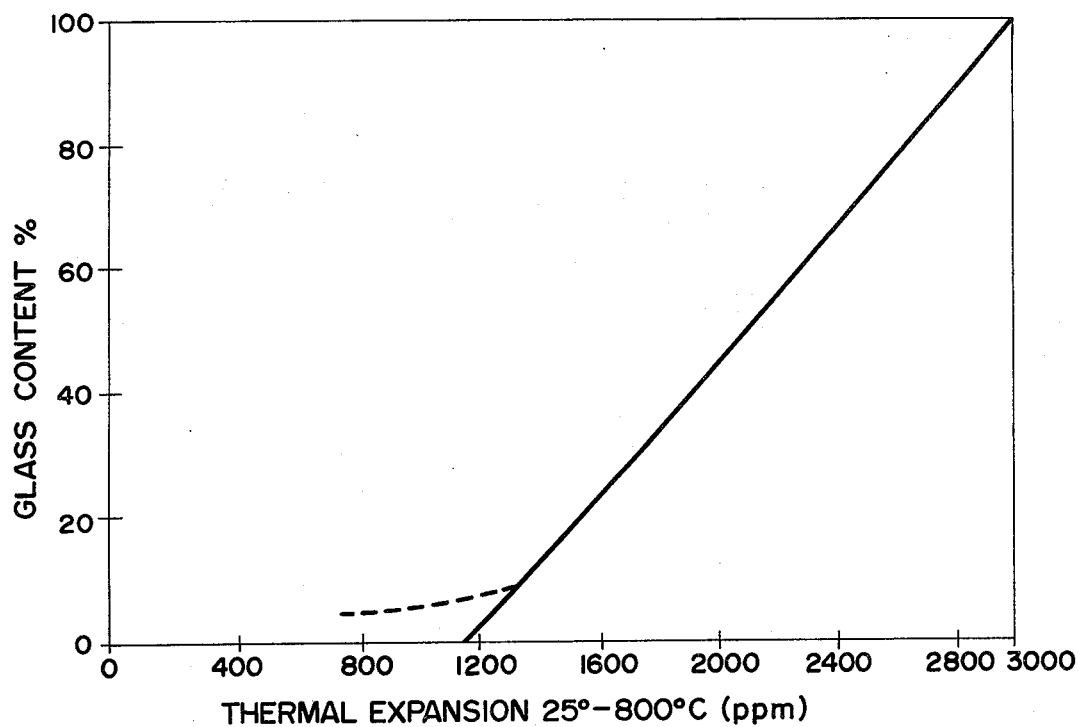
FIG. 1 is a graph of glass content in volume percent of synthetic cordierite-containing bodies vs. thermal expansion in parts per million within the temperature range 25° to 800°C, the solid line showing thermal expansion obtainable by the prior art and the dotted line showing thermal expansions obtainable by the invention; within the temperature range 25° to 800°C.

Referring now to FIG. 1, which is a graph of glass content in volume percent of a synthetic cordierite-containing ceramic body vs. thermal expansion in parts per million within the range 25° to 800°C, it is seen that by variation of the glass content of the body through conventional processing, thermal expansion can be varied linearly between about 1120 (the calculated value of a 100% polycrystalline cordierite body) and 3,000 parts per million (the measured value of a 100% glass body having the composition of cordierite) within the range 25° to 800°C (solid line). In accordance with one aspect of the invention, microstructural parameters can be varied by appropriate heat treatment to produce microcracks, resulting in thermal expansion values below 1100 parts per million with the range 25° to 800°C for bodies containing less than about 10 percent of glass phase, and preferably from about 2 to 5 percent of glass phase. An example of such values of thermal expansion are represented by the dotted line.

In order to obtain thermal expansions below 1100 parts per million within the above range, microcracks should be at least 3 micrometers ($\mu$m) in size and have a frequency of occurrence of at least 0.02 per $\mu$m. For optimum combinations of both thermal expansion and mechanical strength, it is preferred to maintain microcrack size within the range 15 to 150 micrometers and frequency of occurrence below 0.25 per micrometer.

Figure 2:
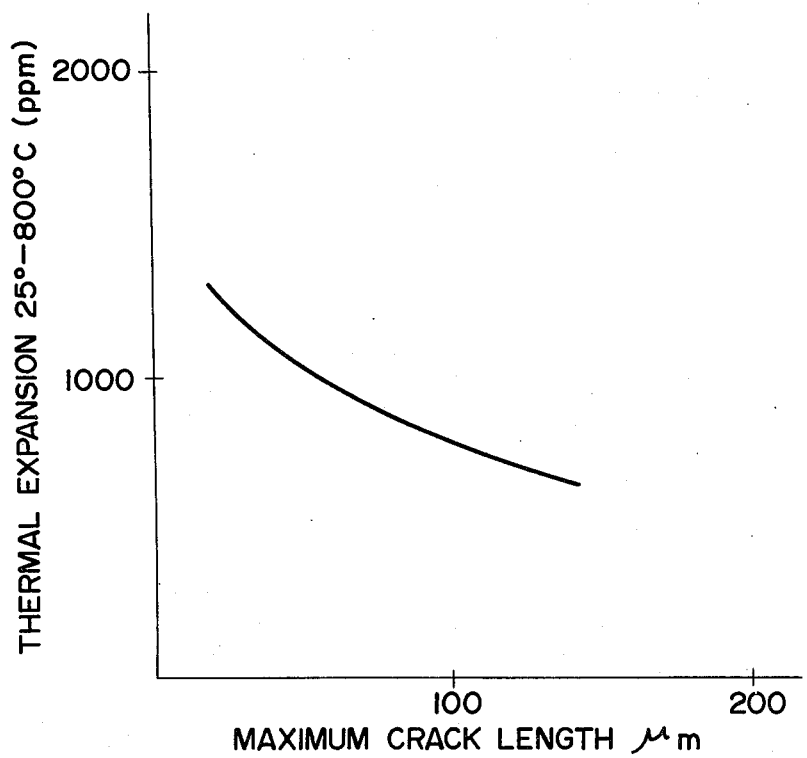
FIG. 2 is a graph of thermal expansion in parts per million within the temperature range 25° to 800°C for a synthetic cordierite ceramic body vs. microcrack length in micrometers exhibited by the microstructure of the body.

In FIG. 2 thermal expansion in parts per million between 25° 800°C is plotted as a function of microcrack size for samples with microcrack occurrence frequency of approximately 0.05 per $\mu$m. As may be seen from FIG. 2, as maximum microcrack length increases to about 150$\mu$m thermal expansion decreases to about 700 parts per million.

Figure 3:
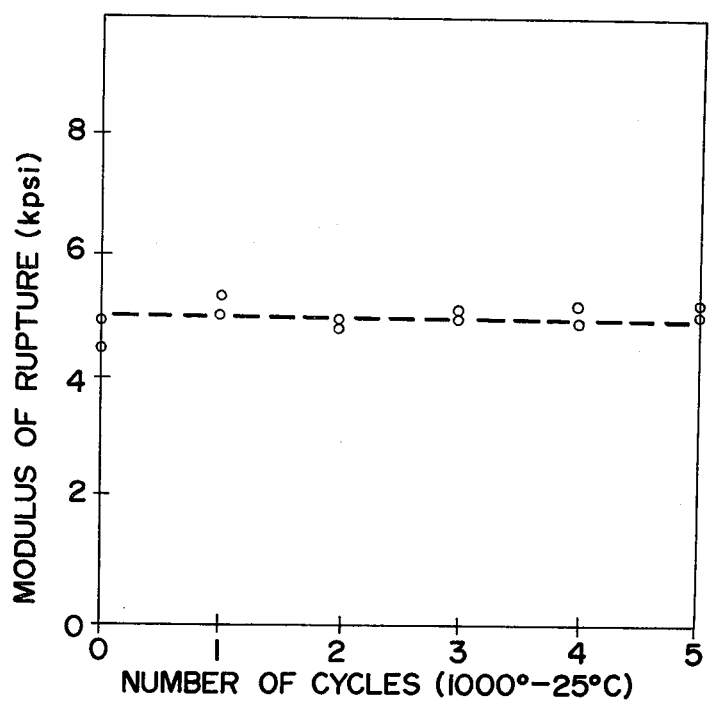
FIG. 3 is a graph of modulus of rupture in psi $\times 10^3$ of synthetic cordierite bodies of the invention vs. number of thermal heating cycles between 1,000° and 25°C.

The introduction of microcracks in synthetic cordierite ceramic bodies tends to lower the flexural strength. The corresponding lower elastic modulus tends to compensate somewhat for the lower strength. This in combination with the significantly lowered thermal expansion results in a ceramic body with outstanding thermal shock resistance. For example, a body of the invention having a thermal expansion of about 700 parts per million within the temperature range 25° to 800°C and a modulus of rupture of 5,000 psi $\times 10^3$ was rapidly heated by placing specimens directly into the furnace at 1000°C and cooled (air quenched) to 25°C with no degradation of flexural strength after five cycles. These results are depicted graphically in FIG. 3.

A suitable process for producing the low thermal expansion cordierite-containing bodies of the invention will now be described.

Figure 4:
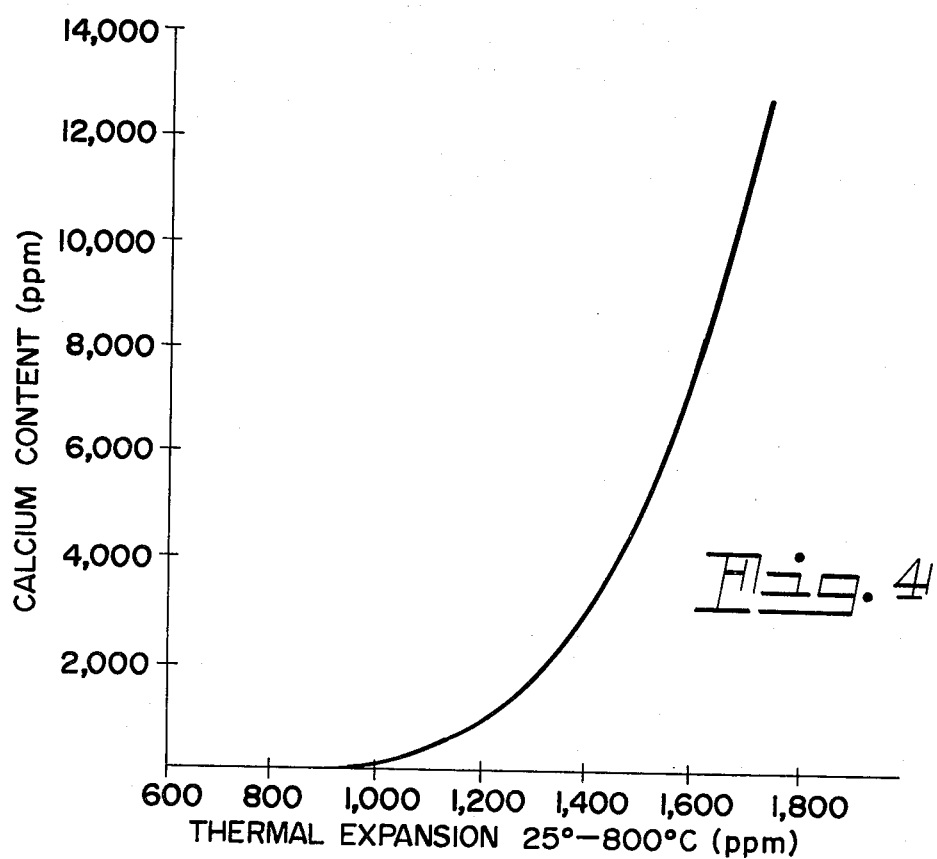
FIG. 4 is a graph of the calcium content in parts per million of a synthetic cordierite body vs. thermal expansion in parts per million within the range of 25° to 800°C.

The selection of starting materials is critical to the success of the described process, both as to mineral content and impurity level. Starting materials are talc, ball clay and a reactive form of alumina, such as $\alpha Al_2O_3$ or a compound which upon heating will convert to a reactive form at sintering temperatures, such as aluminum hydroxide. The presence of impurities which tend to lower the melting point of the reactants, to stabilize a glass phase or to impede crystallization in some other way, are detrimental to obtaining the desired low thermal expansion body. Particularly detrimental in this regard is calcium. As may be seen from FIG. 4, wherein calcium content in parts per million of a cordierite body is plotted vs. thermal expansion in parts per million within the range 25° to 800°C for samples fired at 1375°C for 10 hours, as little as a few hundred parts per million of calcium effectively increases thermal expansion several hundred parts per million. Permissible ranges of impurities are as follows: alkaline earths, calcium, strontium, and barium should be kept below about 600 parts per million total, and preferably below about 300 parts per million total, and each alkaline earth should be kept below about 200 parts per million, and preferably below about 100 parts per million; alkali metals lithium, sodium and potassium should be kept below about 6,000 parts per million total, and preferably below about 3,000 parts per million total; iron below about 0.5 weight percent; titanium below about 1 weight percent and preferably below about 0.5 weight percent.

Starting materials are chosen and proportioned to achieve a final sintered ceramic composition within the range in weight percent 13 to 16 percent MgO, 30 to 36 weight percent $Al_2O_3$, and 49 to 54 weight percent $SiO_2$. These starting materials are then mixed and reduced in particle size by ball milling, preferably in non-contaminating milling media in order to maintain acceptable impurity levels. Such ball milling is typically carried out for a time within the range of about 5 to 24 hours, resulting a surface area of about 20 square meters per gram, which has been found to be satisfactory for the achievement of the desired low expansion cordierite bodies. For achievement of lowest thermal expansions i.e., below 800 parts per million,) it is preferred to dry ball mill, that is, to carry out milling in the absence of liquid media.

Talc may optionally be subjected to a calcining step prior to mixing of the starting materials in accordance with standard practice in the ceramic arts, for example, to increase its bulk density. However, the ball clay should not be subjected to clacining, since such calcining, for reasons not completely understood at this time, prevents the achievement of the desired low thermal expansion cordierite bodies of the invention. The ball milled material is thus consolidated without calcining into a final desired shape, together with any desired binders or plasticizers, by any of the conventional ceramic forming techniques such as pressing, extruding, casting, etc., followed by firing the consolidated green ceramic body in accordance with the following schedule. The body is heated at a rate of up to 350°C per hour, and preferably up to 150°C per hour to a temperature within the range of about 1350° to 1425°C. Heating at a faster rate would result in mechanical failure of the green ceramic body. The body is then maintained within this temperature range for a time dependent upon the particular temperature. At about 1350°C., the time should be at least six and preferably at least about 10 hours in order to achieve optimum final properties. Heating at about 1425°C should be carried out for from about ½ hour up to 1 hour maximum and preferably up to ¾ hour maximum in order to achieve optimum final properties. Sintering outside these temperature ranges or time limitations will result in failure to develop the required microstructure and cordierite composition necessary for the development of microcracks upon cooling. Within the above ranges it is preferred to carry out heating at a temperature of from about 1375° to 1400°C for about 3 to 5 hours. Cooling should be carried out at a rate of up to 500°C per hour, and preferably from 30°C per hour to 150°C per hour down to a temperature below 1,000°C and preferably below about 500°C, and may thereafter be cooled to room temperature at a noncritical rate such as by air quenching. Too rapid cooling from the sintering temperature would result in excessive crack size or frequency of occurrance and consequent reduction in flexural strength of the resulting ceramic body to below acceptable levels.

EXAMPLE I

Talc, ball clay and alpha alumina ceramic raw materials were characterized for impurity levels by sprectrographic analysis as follows: calcium, 10 to 100 parts per million; barium, 1 to 10 parts per million; sodium, 10 to 100 parts per million; potassium 100 to 1000 parts per million; lithium, 10 to 100 parts per million, zirconium, 10 to 100 parts per million; cobalt, 1 to 10 parts per million; iron, 0.05 to 0.5 weight percent; and titanium, 0.01 to 0.1 weight percent. They were then weighed in amounts corresponding to an oxide composition in weight percent of 13.92 percent MgO, 34.90 percent $Al_2O_3$, and 51.18 percent $SiO_2$ and blended by ball milling an aqueous slurry of the materials in a porcelain ball jar with alumina milling media for about 24 hours. This milled material was then dried and characterized in terms of: Mean Particle Size in microns as determined by the Micromirograph technique, a standard technique based on the principle of Stokes Law, Surface Area in square meters per gram, and Particle Size of 75 percent Fraction in microns as determined by Coulter Counter, another standard technique based on particles in an electrically conductive liquid. The milled material was then consolidated into bars by pressing without binders at 12,000 psi. These green test samples were then inserted into an air atmosphere electric furnace at room temperature and heated at the rate of 150° C per hour to 1375° C. A first set of these samples were held at this temperature for 10 hours and a second set were held at this temperature for 60 hours. Both sets were cooled to a temperature of about 400° C at a rate of about 150° C per hour and thereafter air quenched to room temperature. Physical properties of the thus sintered ceramics were then determined. These sample sets are designated as numbers 1 and 2 respectively in Table I wherein results are reported for powder characterization as described above and physical properties, including thermal expansion in parts per million within the range 25° to 800° C, flexural strength as modulus of rupture in psi ×10³, density in grams per cubic centimeter, and open porosity as a percent of total volume. As may be seen from Table I, sample 1, which was fired for 10 hours, exhibits a thermal expansion of 909 parts per million and a modulus of rupture of 9,850 psi×10³. Sample 2 exhibits a thermal expansion of 866 parts per million and a modulus of rupture of 7,100×10³ psi. The excessive firing time for sample 2 of 60 hours was not detrimental to the achievement of desired properties, since sintering was at a temperature below the melting point of cordierite, about 1415° to 1430° C.

EXAMPLE II

Three sets of samples (designated 3, 4 and 5 in Table I) having the sintered compositions in weight percent 13.9 percent MgO, 34.9 $Al_2O_3$ and 51.2 $SiO_2$ were prepared by a procedure similar to that of Example I except that starting materials were ball milled in rubber lined mills with alumina milling media for about 24 hours and all were fired at 1375° C for about 10 hours. In addition, sample 3 was ball milled in an aqueous slurry. Particle size distribution of the milled material prior to consolidation in terms of Micromirograph Mean Particle Size, Surface Area by BET analysis and Fisher SubSieze Size (FSSS) are shown in Table I together with the physical properties thermal expansion, modulus of rupture, density and open porosity. As in Example I, results indicate that acceptable cordierite bodies having low thermal expansions are achievable by the method of the invention.

EXAMPLE III

Figure 5:
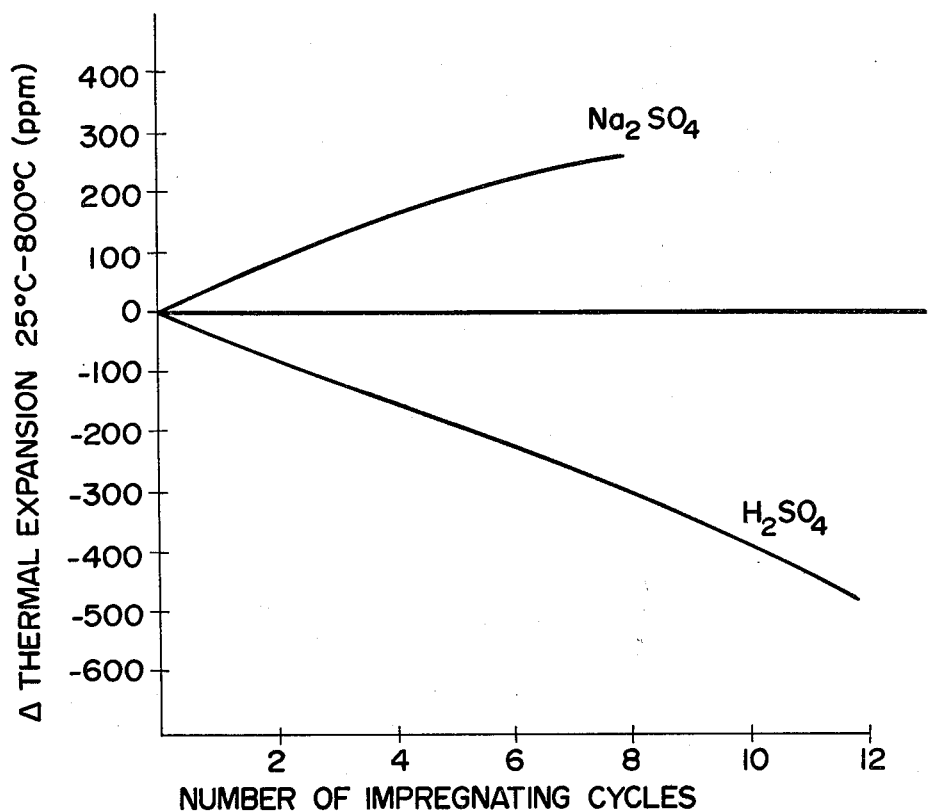
FIG. 5 is a graph of thermal expansion in parts per million within the range 25° to 800°C vs. number of impregnating cycles as a measure of chemical durability.

Honeycomb structures were fabricated from the materials used to prepare samples 4 and 5, and chemical durability of these structures evaluated as follows:

One set of honeycomb structures were dusted with $Na_2SO_4$ until about a 0.25% weight gain was recorded. The structures were then placed in an oven at about 800° C for about 24 hours. In case of $H_2SO_4$ corrosion resistance testing sample another set was impregnated with 1% $H_2SO_4$ in a vacuum dessicator and then placed in an oven at 260° C for about 2 hours. Thermal expansion of both sets were measured after each two impregnation cycles. Results are shown in FIG. 5.

While there has been shown and described what are at present considered the preferred embodiments of the invention, it will be obvious to those skilled in the art that various changes and modifications may be made therein without departing from the scope of the invention as defined by the appended claims.

TABLE I

| Sample | 1 | 2 | 3 | 4 | 5 |
|---|---|---|---|---|---|
| Mean Particle size (μm) (Micromerograph) | 6.3 | 6.3 | 6.5 | 10.3 | 8.9 |
| Surface Area (M²/gram) (BET Analysis) | 22.5 | 22.5 | 19.4 | 23.5 | 21.9 |
| Particle Size of 75% Fraction (μm) (Coulter Counter) | 10.5 | 10.5 | — | — | — |
| Fisher Sub-Sieve Size (μm) | — | — | 0.88 | 1.20 | 1.20 |
| Thermal Expansion (ppm) (25°C–800°C) | 909 | 866 | 974 | 720 | 722 |
| Modulus of Rupture (psi × 10³) | 9,850 | 7,100 | 7,900 | 4,700 | 4,050 |
| Density (grams/cc) | 2.23 | 2.21 | 2.13 | 2.21 | 2.20 |
| Porosity (open) % | — | — | 15.1 | 12.0 | 12.4 |

What is claimed is:

1. A polycrystalline cordierite-containing ceramic body of magnesium aluminum silicate having the composition in weight percent within the range of 13 to 16 percent magnesium oxide, 30 to 36 percent aluminum oxide, and 49 to 54 percent silicon dioxide, the body consisting essentially of at least 90 percent by weight of crystalline phase, remainder glassy phase, the body characterized by a microstructure having microcracks at least 3 micrometers in length and a microcrack occurrence frequency of at least 0.02 per micrometer, and further characterized by a thermal expansion within the temperature range of 25° to 800°C of up to 1100 parts per million.

2. The body of claim 1 in which the microcracks range in size from 15 to 150 micrometers and the microcrack occurrence frequency is up to 0.25 per micrometer.

3. The body of claim 1 consisting essentially of from 95 to 98 percent by weight of crystalline phase, remainder glassy phase.

4. The body of claim 1 characterized by a thermal expansion of up to 800 parts per million.

5. A process for producing a polycrystalline cordierite containing magnesium aluminum silicate ceramic body, the body consisting essentially of at least 90% by weight of crystalline phase, remainder glassy phase, the body characterized by a microstructure having microcracks at least 3 micrometers in length and a microcrack occurrence frequency of at least 0.02 per micrometer, and further characterized by having a thermal expansion within the range of 25° to 800°C of up to 1100 parts per million, the process comprising:
 a. combining talc, ball clay and alumina containing starting materials in amounts to achieve a sintered ceramic body having the composition in weight percent 13 to 16 percent MgO, 30 to 36 percent $Al_2O_3$, and 49 to 54 percent $SiO_2$, the starting materials containing less than about 600 parts per million total of the alkaline earths selected from the group consisting of calcium, strontium and barium, less than about 6,000 parts per million total of the alkali metals selected from the group consisting of lithium, sodium and potassium, less than about 0.5 weight percent iron and less than about 1 weight percent titanium,
 b. ball milling the combined starting materials,
 c. consolidating the milled starting materials into a green ceramic body of a desired shape,
 d. heating the green body at a rate of up to 350°C per hour to a temperature within the range of about 1350° to 1425°C,
 e. maintaining the temperature of the green body within the above range for from ½ hour to 1 hour at the higher temperature, and for at least 6 hours at the lower temperature, thereby to convert the green body to a sintered polycrystalline cordierite-containing ceramic body, and
 f. cooling the sintered body at a rate of up to 500°C per hour down to a temperature below 1,000°C.

6. The method of claim 5 wherein the impurity levels of the alkaline earths are kept below about 300 parts per million total, the alkali metals are kept below about 3,000 parts per million total and the titanium is kept below about 0.5 weight percent.

7. The method of claim 5 wherein the body is sintered for from ½ to ¾ hour at the higher temperature, and for at least 10 hours at the lower temperature.

8. The method of claim 5 wherein the body is sintered at a temperature of from about 1375° to 1400°C for about 3 to 5 hours.

9. The method of claim 5 wherein cooling from the sintering temperature is carried out at the rate of from 30° to 150°C per hour to a temperature below 500°C.

10. The method of claim 5 wherein ball milling is carried out as dry ball milling in noncontaminating milling media, resulting in thermal expansions up to about 800 parts per million.

* * * * *